United States Patent [19]
Gallo et al.

[11] Patent Number: 4,699,592
[45] Date of Patent: * Oct. 13, 1987

[54] ROTATABLE CONNECTOR

[75] Inventors: Bruce M. Gallo, Chester; Charles Hannon, Clinton; Augustin, Kurt, Mendham, all of N.J.

[73] Assignee: Telcor, Inc., Chester, N.J.

[*] Notice: The portion of the term of this patent subsequent to Oct. 13, 2004 has been disclaimed.

[21] Appl. No.: 816,809

[22] Filed: Jan. 7, 1986

Related U.S. Application Data

[63] Continuation-in-part of Ser. No. 740,970, Jun. 4, 1985.

[51] Int. Cl.⁴ .............................................. H01R 39/08
[52] U.S. Cl. ........................................................ 439/27
[58] Field of Search ............... 339/5, 8, 154 A, 159 R; 174/178

[56] References Cited

U.S. PATENT DOCUMENTS

| | | |
|---|---|---|
| 4,472,010 | 9/1984 | Parmello .............................. 339/8 R |
| 4,533,796 | 8/1985 | Engelmore ...................... 339/8 R X |
| 4,583,798 | 4/1986 | Blazowich ...................... 339/8 R X |
| 4,590,337 | 5/1986 | Engelmore ...................... 339/8 R X |

Primary Examiner—Eugene F. Desmond
Attorney, Agent, or Firm—Darby & Darby

[57] ABSTRACT

A connector to prevent tangling of a cord having a modular plug at its end which is to be connected to a telephone handset. The connector has a first part which is rotatable relative to a second part with the modular plug of the cord being attached to the connector first part at an angle off of the central axis of the connector, preferably 90 degrees, so that movement of the cord or handset causes the first part to be rotated relative to the second part. The second part of the connector can be integral with the telephone handset.

16 Claims, 8 Drawing Figures

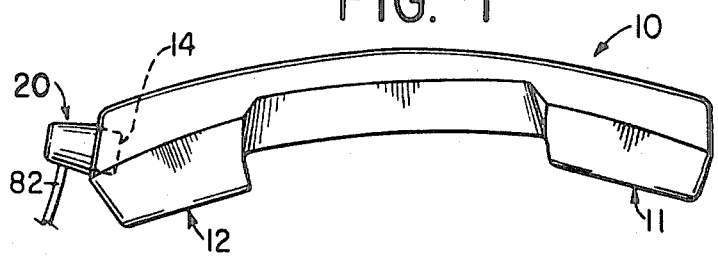
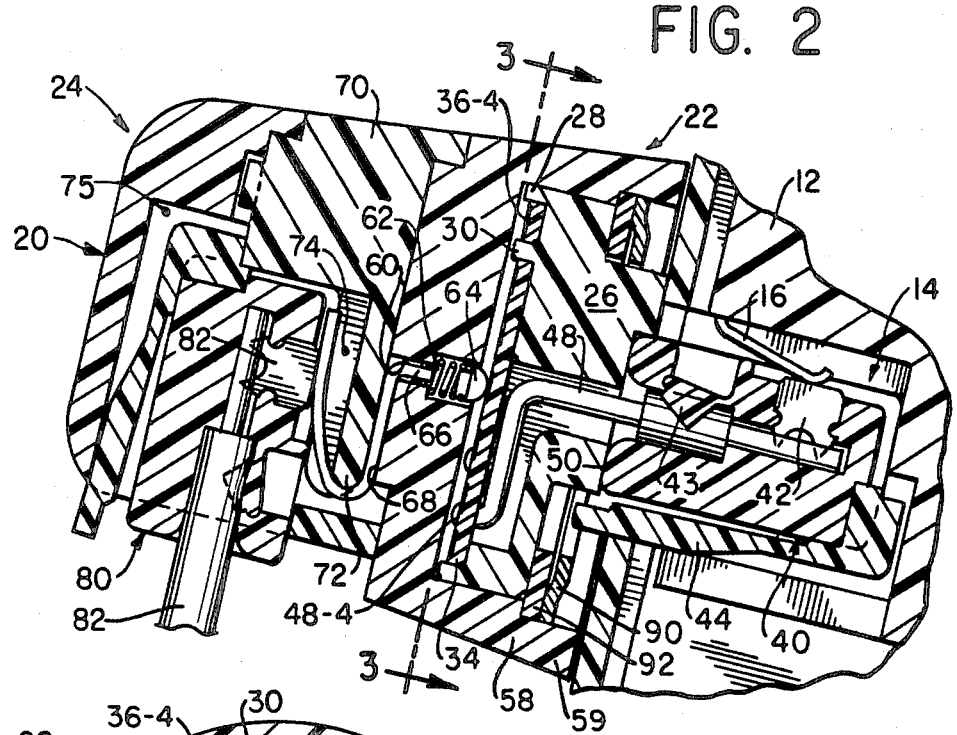
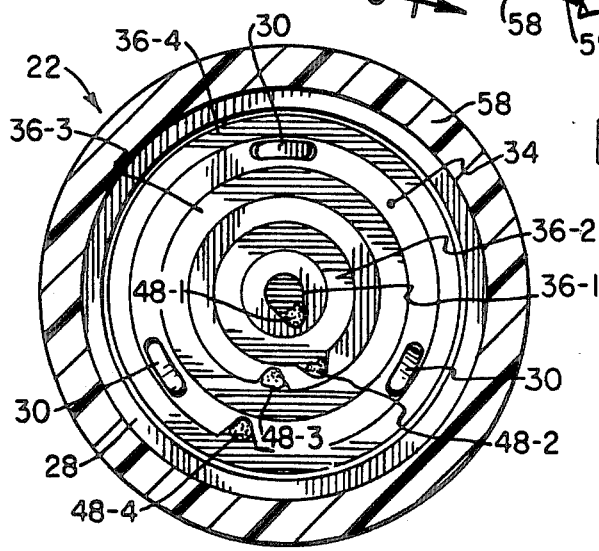

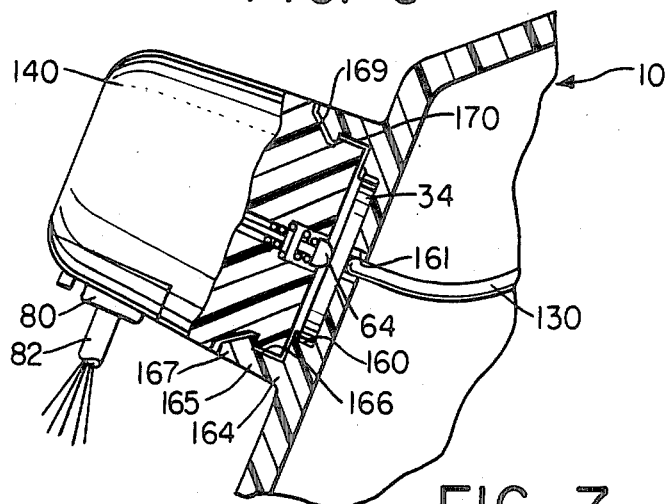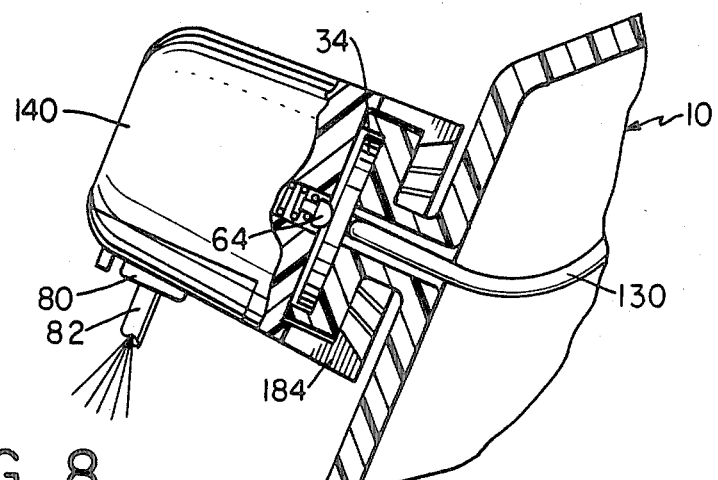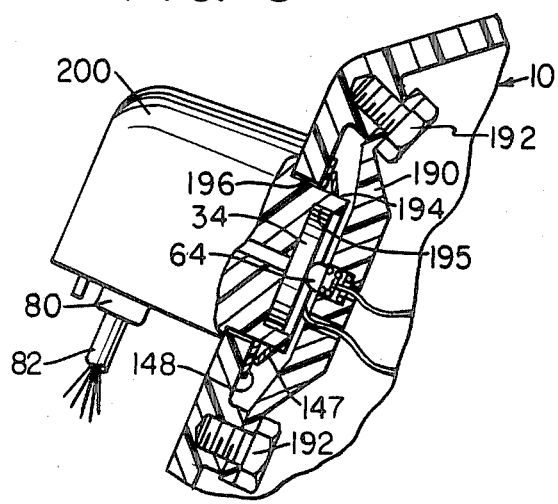

ROTATABLE CONNECTOR

RELATED APPLICATIONS

This application is a continuation-in-part of prior copending application, Ser. No. 740,970, filed June 4, 1985.

The present invention relates to connectors which are capable of rotary movement and particularly connectors which are useful for telephone handsets and other similar devices.

In the present state of the art, various types of connectors exist for imparting rotating movement between two parts with an electrical terminal on each part. The present invention relates to an improved device of this type and, more specifically, one in which one of the connector parts has a receptacle into which the electrical contacts of a modular plug are to be inserted which is at right angles to the major longitudinal axis of the entire connector. Due to the construction of the connector, upon any force being applied to this connector part in a direction substantially normal to the connector's longitudinal axis, the first part is caused to rotate relative to the second part. The improved connector of the present invention is particularly useful where the modular plug which is to be inserted into the first part is at the end of a cord, or wire, so that as the cord is moved, the first part of the connector is caused to rotate and the cord will not coil.

It is therefore an object of the present invention to provide a rotatable connector.

Another object is to provide a rotatable connector having two parts which are rotatable with respect to each other, one of the parts having an entry portion for a modular plug to which a wire is attached which is at a right angle to the exit portion of the other half which has a modular plug for insertion into another modular receptacle.

A further object is to provide a rotatable connector having two parts in which the rotational electrical connection is provided by each of a plurality of contacts riding on a respective conductive track of a printed circuit board.

An additional object is to provide a rotary connector for a telephone handset or similar device, with one of the connector parts being a part of the handset.

Other objects and advantages of the present invention will become more apparent upon reference to the following specification and annexed drawings in which:

FIG. 1 is a perspective view of a telephone handset with which the rotary connector of the subject invention may be used;

FIG. 2 is a view in cross-section of the connector;

FIG. 3 is a cross-sectional view taken along lines 3—3 of FIG. 2;

FIGS. 6, 7 and 8 are further sectional views of other embodiments of the invention similar to those of FIG. 4.

Figure 4:
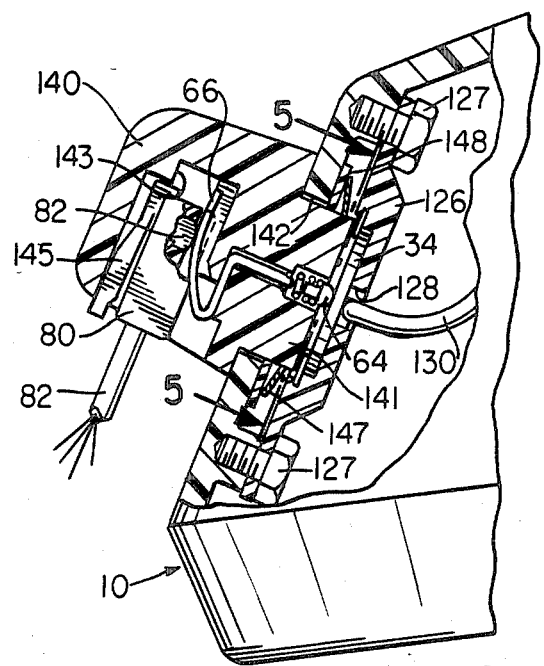
FIG. 4 is a sectional view in elevation showing a further embodiment of the invention.

FIG. 1 shows a typical telephone handset 10 with which the rotatable connector of the present invention may be utilized. Of course, the connector may be used in any suitable application requiring the connection of two relatively rotatable sets of electrical contacts. In the first preferred embodiment of the invention, the handset has a receiver end 11 and a transmitter end 12 with a conventional modular type socket or receptacle 14 at the transmitter end. The modular receptacle 14 has the usual spring loaded contacts 16 (one of which is shown in FIG. 2) into which a modular plug is to be inserted. Typically, a modular plug-receptacle arrangement uses four in-line contacts, although more or less can be used.

The rotatable connector 20 of the present invention is to be inserted into the modular receptacle 14 of the transmitter end 12 of handset 10. It is intended to provide electrical connection between the individual wires of a cord 82 and the handset contacts 16 in receptacle 14 while permitting the cord 82 to move relative to the handset without undesirably coiling or winding up.

The connector 20 includes respective male and female parts 22 and 24 which can rotate relative to each other. The male part 22 includes a mounting base 26 having a raised peripheral lip 28 and a plurality of raised mounting tabs 30 extending from its front face, three of which are illustratively shown, although more or less can be used. A circular printed circuit board 34, or flexible web, with suitable circuit conductors 36 laid thereon is mounted on the base 26. The board 34 has a circular central conductive pad area 36-1 and three concentric surrounding circular tracks 36-2, 36-3 and 36-4 of progressively increasing diameter. There is a space between each of the tracks 36 and the tabs 30 of the mounting base 26 protrude through the space between the tracks 36-3 and 36-4 so that the circuit board can be mounted on base 26. This can be done either by an adhesive or by ultrasonically welding the tabs 30 to or deforming the top parts thereof over the printed circuit board.

A conventional modular plug 40 having the usual lever latch 44 thereon is mounted to the bottom end of the mounting base 26. The plug 40 has the usual set of protruding contacts 42 which are in contact with the corresponding spring type contacts 16 in the modular receptacle 14 of the handset. A respective wire 48 protrudes through the circuit board 34 and is soldered to a respective track 36 thereon so that there is an individual contact with each of the tracks 36. This can be done by making a hole to each conductive area 36, through plating the hole, and making the solder contact in the hole. Thus, the front face of the board 34 will have no protrusion. The head end of each wire 48 is shown in FIG. 3.

Each of the wires 48 as it exits from the rear face of the printed circuit board 34 is bent by 90° to lie generally parallel to the rear face of the circuit board and thereafter bent another 90° to enter into the body of the modular plug 40 where they are held by the usual crimping arrangement 43. The modular plug 40 is secured by an adhesive or ultrasonically welded to the lower end of the mounting base 26 at the area 50 where the two mate.

The female part 24 of the connector includes a shell 58 having a series of four holes therein in line with the four tracks 36 on the upper face of the printed circuit board 34. A spring loaded contact assembly 62 which is formed by a laser welded coil spring, for example of beryllium copper, with a contact tip 64 welded to one end and a bare wire 66 to the other end. Each of the contact assemblies is first inserted through a respective hole 60 in the base of the shell, bare wire lead 66 first, until the spring assembly 62 is seated within the respective hole 60. The respective leads 66 are then bent over into a respective channel 68 formed on the bottom of the shell 58.

A wire guide 70 is then pressed onto the top portion of the shell 58 to overlie the channel 68. The wire guide 70 and cap 20 form a receptacle 75 for accepting a modular type plug 80 which is separate from the connector. The wire guide 70 is formed with a shelf 72 which, when the cap is assembled to the shell, extends over the ends of shell channels 68 and forms a part of the receptacle for external jack 80. The shelf 72 has a plurality of channels 74 thereon corresponding to the number of contact assemblies and the channels 68 of the shell. The free ends of the wires 66 are respectively bent into the chanels 68 to serve as the spring contacts for the external modular plug 80 having the usual conductors 82 therein with leads which have the respective contacts 86.

As seen in FIG. 2, the shell 58 of the female part 24 has a stepped lower end 59 and is held to the lower surface of the mounting base 26 of the male half by a spring loaded retaining clip 90 with an intermediate bearing washer 92 which can be of plastic, fiber or any other suitable material.

As seen from FIG. 2, the plug 40 on male part 22 of the rotary connector plugs into the receptacle 14 of the handset 10 and the female part 24 provides receptacle 75 for the modular plug 80 to which the telephone cord 82 is connected. The receptacle 75 is at a right angle to plug 40. The two parts 22, 24 are held together by the retaining clip 90 which prevents them from separating. However, the female half can be rotated freely about the male half, i.e., the shell 58 has a rotating clearance relative to the base 26 of the male part 22.

Unlike similar designs where a cord enters the connector axially, i.e. the two parts of the connector would make an in-line, or axial, connection and the input and output ends are in-line, in the present invention, the cord 82 enters at 90° relative to the connector's longitudinal axis. Thus, as someone moves the handset 10 or the cord 82, instead of the cord 82 coiling or "winding up", turning force is provided for the connector female part 24 to overcome any friction between the male and female parts and causing the female part 24 to rotate relative to the male part 22. That is, the connector uses the leverage from the cord or the handset which are at right angles to each other to cause relative rotation of the two connector parts.

As should be apparent, electrical contact is provided between each of the wires of the cord 82 through a respective contact 86 of the modular plug 80 and the wire end 68 and the tip of a contact assembly 62. The rotatable contact is maintained between the two connector parts by the tips 64 of the contact assemblies 62 riding on the conductive tracks 36 of the printed circuit board. Thereafter the wires 48 connected to the tracks 36 enter the male modular plug 40 and the end of each wire is provided with an electrical terminal 42 which makes contact with spring type terminal 16 of the modular receptacle of the handpiece.

Figure 5:
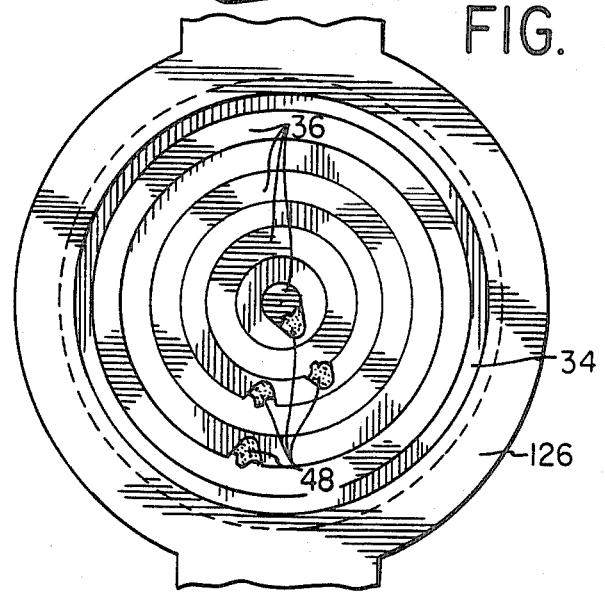
FIG. 5 is a view in cross section along lines 5—5 of FIG. 4.

FIGS. 4 and 5 show a first further embodiment of the invention where one part of the connector is integrally mounted as part of the handset 10. Here a mounting base 126 of a suitable insulating material, corresponding to the base 26 of FIGS. 1–3, is provided. The base is attached to the end wall of the handset via screws 127. Base 126 holds the printed circuit board 34 in the manner previously described with reference to FIGS. 2 and 3.

The base 126 has a central opening 128 through which the wires 130 protrude to the printed circuit board 34. There are four wires 130, although one is shown. FIG. 5 shows the printed circuit board 34 the tracks 36 and the wire connections 48 as shown in FIG. 3.

The second part 140 of the connector is generally cylindrical overall and has a reduced diameter bottom end 141 which is inserted through a central opening 142 in the handset. The second part 140 includes the spring loaded contacts 64 for riding on and making contact with the respective tracks 36 of the printed circuit board and also the bent spring contacts 66 for making contact with the individual contacts 82 of the modular connector 80 which is inserted into the opening 143 in the second part 140. A resilient latch member 145 is provided to hold the modular plug 80.

The reduced diameter portion 141 of the second part 140 is permitted to rotate within the opening 142 for a full 360 degrees. It is held to the opening by a metal retaining clip 147 attached to the reduced diameter part 141 which acts against a thrust washer 148.

The operation of the connector of FIGS. 4-5 is as previously described. That is, as the cord 82 attached to the modular jack is rotated, connector part 140 rotates and prevents the cord from winding up.

FIG. 6 shows a further embodiment of the invention which is similar to FIGS. 4-5. Here, a different arrangement is used at the end of the handset by providing its end wall with a recess 160 in which the printed circuit board 34 is mounted, for example as previously described or by an adhesive. There is an opening 161 at the end wall of the hanset to provide entry of the wires 130 to the printed circuit board 34.

A protruding collar 164 is molded onto the end of the handset. The collar has an upstanding wall 165 with an inturned, angled lip 167 which forms a track 166.

The second part 140 of the connector has an angled groove 169 and shoulder 170 formed at its lower end. The second part 140 is pushed into the collar 164 until the shoulder 170 snaps into the track 166. The angled lip 167 and angled groove 169 provide stability as part 140 is rotated.

FIG. 7 shows a further embodiment of the invention in which an outwardly projecting pedestal through which the wires 130 extend. Here, the second part 140 has an inturned lip 184 at its bottom end which snaps over the pedestal top. The inturned lip rotates around the pedestal leg.

FIG. 8 shows a further embodiment of the inventio on which a base 190 is held at the end of the handset by screws 192. The base 190 includes the spring loaded contacts 64.

The second part of the connector 200 has a lower end 194 of reduced diameter which extends into the opening 196 at the end of the connector. In this embodiment, the printed circuit board 34 is mounted in recess 195 in the lower end 194. The second part 200 is permitted to rotate within the opening 196 and is held by the retaining clip 147 and thrust washer 148.

In the construction of the connector, all of the other parts are of any suitable insulating material and are preferably molded of a plastic material.

What is claimed is:

1. A rotatable connector for a telephone handset or the like comprising
   a first part having terminal means thereon for connection to said handset;

a second part coupled to said first part for rotation relative to said first part about a central axis common to said first and second parts, said second part having modular terminal means thereon which are located on said second part at a fixed angle displaced from said common axis of greater than 0° and less than 180° and preferably by substantially about 90° to accept at said fixed angle from said common axis an external modular terminal having a cord attached thereto which can be twisted, the movement of the cord relative to said connector first part by movement of either the cord or the handset providing a torque force to said second part at said angle displaced from said common axis so that said second part rotates relative to said first part to prevent twisting of the cord, and means for providing electrical connection between the terminal means of said first and second parts as one part of the connector is rotated relative to the other.

2. A rotatable connector as in claim 1 wherein the terminal means of said first part is also a modular terminal adapted to be inserted into a modular terminal means of said handset.

3. A rotatable connector as in claim 1 wherein the modular terminal means of said second part is a receptacle.

4. A rotatable connector as in claim 3 wherein said means for providing the electrical connection comprises means having an electrical circuit thereon with at least one conductive track located in one of said connector parts and a wire connecting each of said conductive tracks to a respective terminal of said modular terminal means of said one connector part, and at least one spring biased contact means in said other connector part for contacting a respective conductive track as the connector parts are rotated, and a wire connecting each of said contact means to a respective terminal of the modular terminal means of said other part.

5. A rotatable connector as in claim 4 wherein the modular terminal means of one part is a plug and the modular terminal means of the other part is a receptacle.

6. A rotatable connector as in claim 4 wherein said means having an electrical circuit thereon comprises a board having printed circuit thereon with said conductive tracks.

7. A rotatable connector as in claim 4 wherein said one connector part comprises a base having an upper surface on which said electrical circuit means is located, said base having a passage through which each wire connected to a conductive track passes, the modular terminal means of said one connector part being attached to said base.

8. A rotatable connector as in claim 7 wherein the axis of the terminal means of said first part is generally transverse to the plane of the electrical circuit means, each said wire being bent by substantially 90° to enter said modular terminal means, and means on the base for supporting the wire.

9. A rotatable connector as in claim 8 wherein the other connector part is formed with a shelf which lies generally parallel to the plane of said electrical circuit means, each said contact means of said other part comprising a wire which is bent around said shelf and a contact tip connected to one end thereof for engaging a respective conductive track of said electrical circuit means.

10. A rotatable connector as in claim 1 wherein said connector first part is integrally attached to said handset.

11. A rotatable connector as in claim 10 wherein said means for providing the electrical connection comprises means having an electrical circuit with at least one electrically conductive track thereon located on said first connector part which is integrally attached to said handset and means each for contacting a respective one of said conductive tracks mounted on said second part.

12. A rotatable connector as in claim 10 wherein said means for providing the electrical connection comprises a member having electrical circuit means thereon with at least one conductive track located in one of said connector parts and a wire connecting each of said conductive tracks to a respective terminal of said terminal means of said one connector part, and at least one spring biased contact means in said other connector part for contacting a respective track as the connector parts are rotated, and a wire connecting each of said contact means to a respective terminal of the terminal means of said other part.

13. A rotatable connector as in claim 12 wherein said spring biased contact means are mounted on said connector part which is integrally attached to asid handset and said electrical circuit means is located on the other connector part.

14. A rotatable connector as in claim 12 wherein said two connector parts have mating means for attaching said one connector part to said other connector part while permitting rotation of said one part relative to said other part.

15. A rotatable connector as in claim 14 wherein said mating means comprises a collar formed on said one part with a recessed track therein and a shoulder on said other part fitting into said track.

16. A rotatable connector as in claim 14 wherein said mating means comprises a pedestal on said one part having a top and a recessed area in the bottom of said second part for receiving said pedestal top.

* * * * *